United States Patent
Sakaguchi et al.

(10) Patent No.: US 7,165,083 B2
(45) Date of Patent: Jan. 16, 2007

(54) FILE MANAGEMENT METHOD IN A DISTRIBUTED STORAGE SYSTEM

(75) Inventors: Akihiko Sakaguchi, Tachikawa (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 10/834,866

(22) Filed: Apr. 30, 2004

(65) Prior Publication Data

US 2005/0027718 A1 Feb. 3, 2005

(30) Foreign Application Priority Data

Jul. 29, 2003 (JP) ............................. 2003-282049

(51) Int. Cl.
*G06F 7/00* (2006.01)
*G06F 17/30* (2006.01)
*G06F 12/00* (2006.01)

(52) U.S. Cl. .......................................... 707/204; 707/8
(58) Field of Classification Search ................ 707/204, 707/202, 8; 709/241; 711/162
See application file for complete search history.

(56) References Cited

U.S. PATENT DOCUMENTS

| | | | |
|---|---|---|---|
| 5,799,305 A * | 8/1998 | Bortvedt et al. ............... 707/10 |
| 6,256,675 B1 * | 7/2001 | Rabinovich ................. 709/241 |
| 6,654,771 B1 * | 11/2003 | Parham et al. .............. 707/204 |
| 6,886,019 B1 * | 4/2005 | Cannon et al. ............. 707/204 |
| 2002/0016792 A1 | 2/2002 | Ito et al. |
| 2003/0093439 A1 * | 5/2003 | Mogi et al. ................. 707/200 |
| 2004/0243571 A1 | 12/2004 | Judd |
| 2005/0027757 A1 | 2/2005 | Kiessig et al. |

OTHER PUBLICATIONS

"Kernal of the Most Advanced UNIX"by Uresh Vahalia pp. 373-374.

* cited by examiner

*Primary Examiner*—Apu Mofiz
*Assistant Examiner*—Michael J. Hicks
(74) *Attorney, Agent, or Firm*—Mattingly, Stanger, Malur & Brundidge, P.C.

(57) ABSTRACT

This invention enables a file to be accessed even during replication while maintaining its consistency. The replication is done among a plurality of distributed storage devices, a file is searched, in response to an access request from a client machine #11, from GUID management databases 13, 23 each of which stores a relationship between a GUID of a file stored in a storage device #0 (#1) and a device ID of a storage device containing an original file. When the storage device #1 does not have the demanded file, a device ID (#0) of a storage device containing its original file is searched from the GUID management database based on a GUID of the file C, and the file C demanded by this the storage device #0 is accessed.

6 Claims, 14 Drawing Sheets

FIG.5

GUID ALLOCATION DB

| BLOCK OF GUID | STORAGE DEVICE NUMBER | STORAGE DEVICE ID |
|---|---|---|
| 10001~20000 | #0 | 172.29.1.1 |
| 20001~30000 | #1 | 172.29.1.2 |
| 30001~40000 | #0 | 172.29.1.1 |

FIG.13

| GROUP | STORAGE DEVICE ID |
|---|---|
| A | 172.29.1.1, 172.29.1.2 |
| B | 172.29.2.1 |
| C | 172.29.2.2 |

SCREEN FOR REGISTRATION OF
STORAGES SHARED THE INFORMATION    S401

INPUT IP ADDRESS :  172.29.1.1

SCREEN FOR REGISTRATION
OF A GROUP    S402

INPUT GROUP NAME :  A

SCREEN FOR REGISTRATION
OF A GROUP    S403

INPUT GROUP NAME :  B

FILE MANAGEMENT METHOD IN A DISTRIBUTED STORAGE SYSTEM

CLAIM OF PRIORITY

The present application claims priority from Japanese application JP 2003-282049 filed on Jul. 29, 2003, the content of which is hereby incorporated by reference into this application.

FIELD OF THE INVENTION

This invention relates to improvement of a distributed storage system in which storage devices are arranged in a distributed manner, and files stored in the storage devices are shared through a network.

BACKGROUND OF THE INVENTION

As a client/server type distributed storage system (or equipment), the Andrew File System (hereinafter referred to as AFS) is known (Non-Patent Literature 1).

This system is a system that gives each file an identifier having a location field in it, acquires a location of this file from information of its location field, and accesses to an object file. For this purpose, a location database for managing location fields is installed on an arbitrary site on a network, and when an client accesses a file, the client inquires the location field included in the identifier from the location database, and accesses to the location that the location database replied.

Moreover, a file that was accessed once is cached by a storage device, a cache server, or the like, which improves an access speed thereto next time and thereafter.

[Non-patent Literature 1]

"Kernel of the most advanced UNIX" (Japanese translation), pp. 373–374 and 376 written by Uresh Vahalia, translated by Hideyuki Tokuda, Yoshito Tobe, and Etsuyuki Tsuda, published by Pearson Education Japan in May 15, 2000 (The Original, "UNIX Internals: The New Frontiers," by Prentice Hall, Inc. 1996)

However, in the conventional example, when a local storage device has a file, the file can be read or written quickly, but when the local storage device does not have the file, the client will inquire its location from the location database, receive a reply from the location database, and do remote access to an object storage device; consequently, there is a problem that this remote access cannot be made quickly.

Moreover, in the case where the client accesses to a cache by remote access, since exclusive control of access is mandatory in order to ensure consistency of data, there is a problem that availability is lowered. For example, when there are a plurality of WRITE requests to the same file, the system will accept an earliest WRITE request from a client and refuse subsequent WRITE requests.

Furthermore, in the case of doing replication whereby original data of the storage device that serves as a reference is replicated in other storage device located remotely, it takes a time to complete the replication. If there occurs an access to the storage device that is a destination of replication before the replica (duplicate) has been completed, there is a problem that the access request will be an error because a replica of the file has not been created, hence reducing reliability.

SUMMARY OF THE INVENTION

Then this invention has been devised in view of the above-mentioned problems, and its object is to make it possible to access files while maintaining consistency of files even during the replication.

This invention provides a distributed storage system that comprises replication means for making replicas between a plurality of distributed storage devices, wherein each storage device is equipped with: GUID giving means for giving a GUID that acts as a unique identifier within the distributed storage system to the file created by this storage device, a GUID management database for storing a relationship between GUIDs of files stored in this storage device and device IDs of the storage devices containing original files; and file searching means for searching a file in response to an access request for the file from a client machine, wherein, if the said storage device does not have the demanded file, the file searching means searches a device ID of a storage device containing an original file from the GUID management database based on the GUID of the file, and this storage device accesses the demanded file.

This invention therefore realizes the following operation: when the replication is being done between the storage devices, if an access was made by a client machine before the replicate has been created in the storage device, a storage device containing an original file is searched based on its GUID that has been given to the file and acts as a unique identifier, and the original file in this storage device is accessed, whereby the system can fulfill a demand from the client machine surely, thus improving reliability of the distributed storage system that does the replication. Moreover, since the client machine is enabled to access the original file, the consistency of files can be ensured.

BRIEF DESCRIPTION OF THE DRAWINGS

FIG. 5 is an explanatory diagram showing an example of data of a GUID allocation database;

FIG. 13 is an explanatory diagram showing an example of data of the group management database.

DETAILED DESCRIPTION OF THE PREFERRED EMBODIMENTS

One embodiment of this invention will be described below referring to the accompanying drawings.

Figure 1:
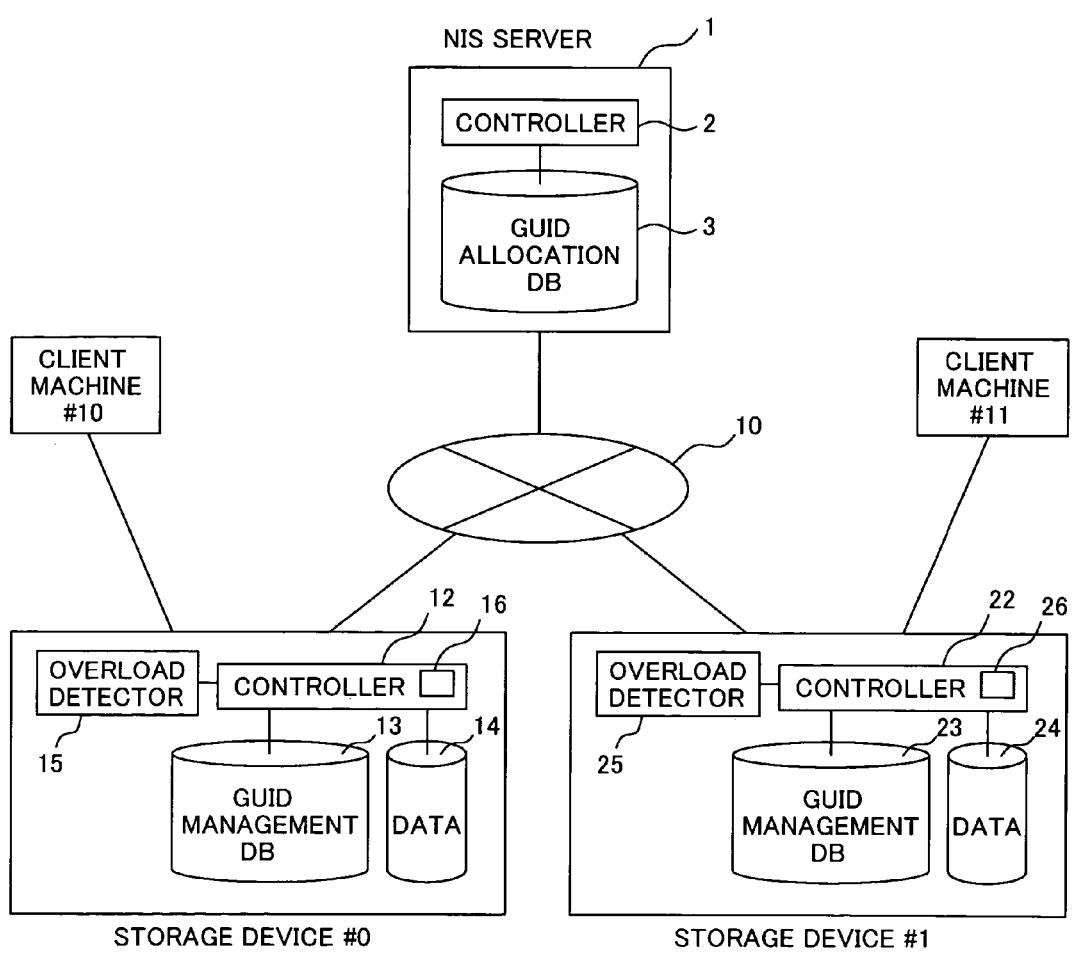
FIG. 1 is a system configuration showing one embodiment of this invention.

FIG. 1 is the configuration of the distributed storage system to which this invention is applied. This FIG. 1 shows an example in which two storage devices #0, #1 and an NIS server (Network Information Server) 1 are connected with one another through a network 10 to construct a distributed storage system. Incidentally, the network 10 represents the Internet, a WAN, a LAN, etc.

The storage device #0 is equipped with a disk 14 for storing files in the form of data and a GUID management database (hereinafter referred to as the GUID management DB) for managing information of GUIDs (Globally Unique Identifiers) given to files stored in the disk 14. The GUID management DB 13 may be stored in the disk 14, or may be stored in a disk other than the storage device #0, not shown.

The GUID given to a file is an identifier that is used to identify the file uniquely on this distributed storage system and is composed of, for example, a number etc. as will be described later.

The GUID management DB 13 and the disk 14 control reading and writing between themselves and both the network 10 and the client machines by a controller 12 comprising a CPU, not shown, memory, an I/O, etc. Moreover, the controller 12 is equipped with a buffer 16 that is used in making a WRITE request that will be described later.

Moreover, the controller 12 is provided with an overload sensing device 15 for measuring a load being processed in the disk 14 or the controller 12 itself. The controller 12 judges the load detected by the overload sensing device 15 in executing the replication, and executes the replication only when the detected load is not more than the predetermined value or in similar situations.

Furthermore, the client machine #10 comprising a CPU, memory, a console, etc., not shown is connected to the storage device #0, so as to be able to use the storage device #0 as a local storage. Here, shown in the figure was the example in which the storage device #0 was connected to the network 10, but all that is required is connection of at least either the client machine #10 or the storage device #0 to the network 10.

The storage device #1 connected to the network 10 is constructed similarly with the storage device #0, that is, constructed with a storage 24 for storing files, a GUID management DB 23 for managing information of GUIDs given to files, a controller 22, a buffer 26, and an overload sensing device 25. The client machine #11 comprising a CPU, memory, a console, etc., not shown is connected to the storage device #1, so as to be able to use the storage device #1 as a local storage as well.

This storage device #1, as with the storage device #0, performs reading and writing between itself and both the storage 24 and the GUID management DB 23 in response to an access from the network 10 or the client machine #11.

Further, the storage device #0 and the storage device #1 read and write the disks 14, 24 in response to local accesses from the client machines #10, #11 or remote accesses therefrom through the network 10, respectively. In addition, when the load of the storage device #0 or #1 is light, the replication whereby original files stored in the storage devices #0 (#1) are replicated in the other storage device #1 (#0) is executed.

The NIS server 1 for managing GUIDs and the storage devices #0, #1 is connected to the network 10. In addition, the NIS server does not necessarily need to be independent as a server, and its function may be added to the storage device or a network device.

The NIS server 1 is made up of a controller 2 comprised of a CPU, memory, a console, etc., not shown, and a GUID allocation database (hereinafter referred to as the GUID allocation DB) 3 for controlling a state of GUID allocation.

The NIS server 1, being connected to the network 10, conducts registration and management of storage devices that constitute the distributed storage system, and allocates GUIDs to be given to files stored in the storage devices #0, #1.

FIG. 1 shows a state in which the storage devices #0, #1 are registered in the NIS server 1 by a system administrator or the like.

Next, a relationship between the GUIDs and both the files and the storage devices will be described referring to FIG. 2 and FIG. 3.

Figure 2:
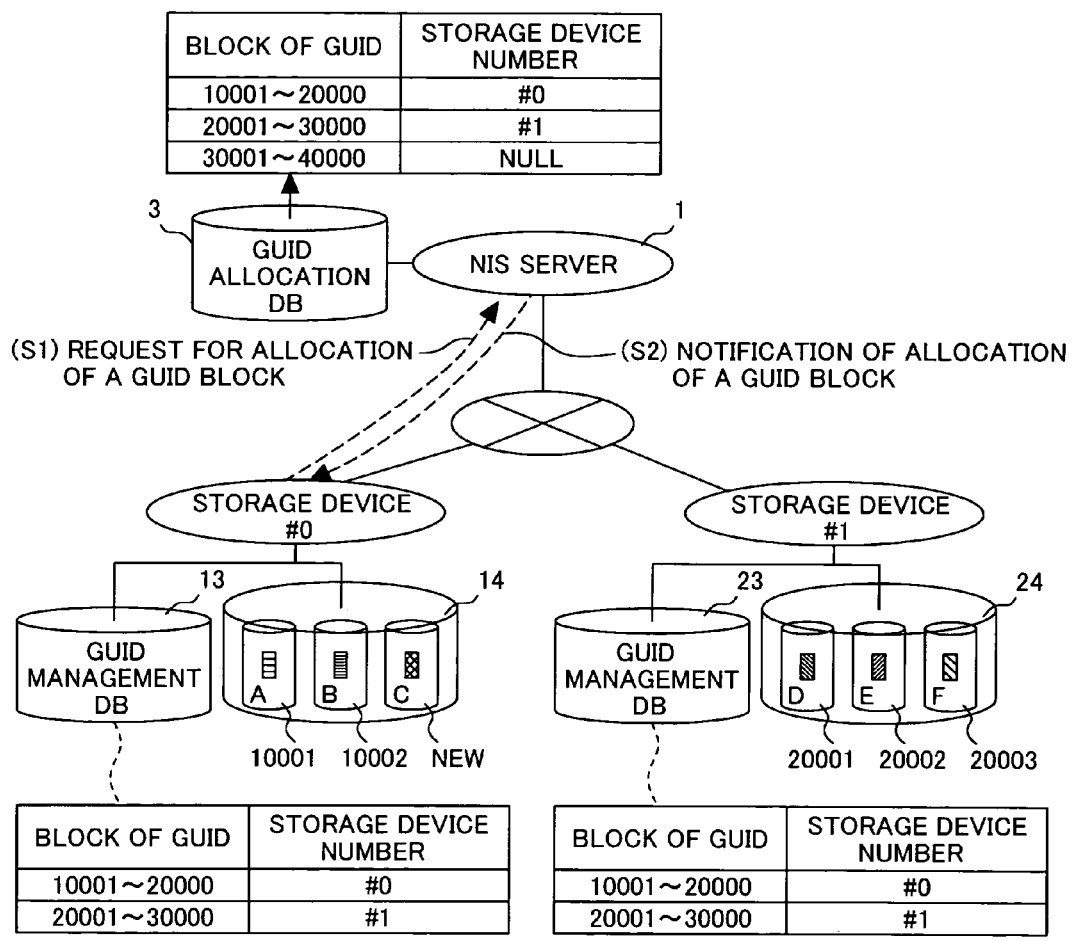
FIG. 2 is an explanatory diagram showing a situation of GUID allocation.

FIG. 2 shows the state in which the disk 14 of the storage device #0 has already stored files A, B, and creates a file C newly. Moreover, the figure shows the state in which a disk 24 of the storage device #1 has already stored files D, E, and F.

In order to uniquely specify files to be stored in the distributed storage system, the storage devices #0, #1 give GUIDs that were allocated by the NIS server 1 to each file. For example, the file A of the storage device #0 is given GUID=10001, the file B is given GUID=10002, and similarly the files D to F of the storage device #1 are given GUID=20001 to 20003, respectively.

These GUIDs are allocated to the storage devices in increments of a block that the NIS server 1 has set in advance, and if unused GUIDs among the GUIDs stored in local GUID management DBs 13, 23 run short, each storage device will make a request to the NIS server 1 for allocation of GUIDs.

The NIS server 1 that accepted the request gives the storage device unused GUIDs in increments of a block, updates the GUID allocation DB 3 of the NIS server 1, and subsequently broadcasts a storage device number (or device ID) that received allocation of the GUID block to the storage devices #0, #1 constituting the distributed storage system. Note that a block of GUIDs means a group of identifiers that are continuous in a previously set range, and, for example, contiguous numbers of 10000 are dealt with as one block as shown in the figure.

The storage devices #0, #1 store the GUID blocks and the storage device numbers that were broadcast from the NIS server 1 in their GUID management DBs 13, 23, respectively. Thereby, when each storage device accepts an access request, the storage device can specify which storage device is storing its original file.

Now, in FIG. 2, when the storage device #0 creates the new file C and has already used up allocated GUID block (10001–20000), the storage device #0 makes a request to the NIS server 1 for allocation of a GUID block (shown by S1 in the figure).

The NIS server 1 that accepted the request investigates the GUID allocation DB 3, finds that the first block 10001–20000 has been allocated to the storage device #0 and the second block 20001–30000 has been allocated to the storage device #1, and hence allocates the third GUID block 30001–40000 that is unused to the storage device #0 and makes notification of it (shown by S2 in the figure).

The storage device #0 that received the notification gives a GUID=30001 that is unused and minimum to the new file C.

Alternatively, allocation of a GUID block may be requested when the unused GUIDs become a few before the unused GUIDs are used up. Incidentally, a GUID to be given to the file may not be necessarily a minimum as long as it is unused.

Figure 3:
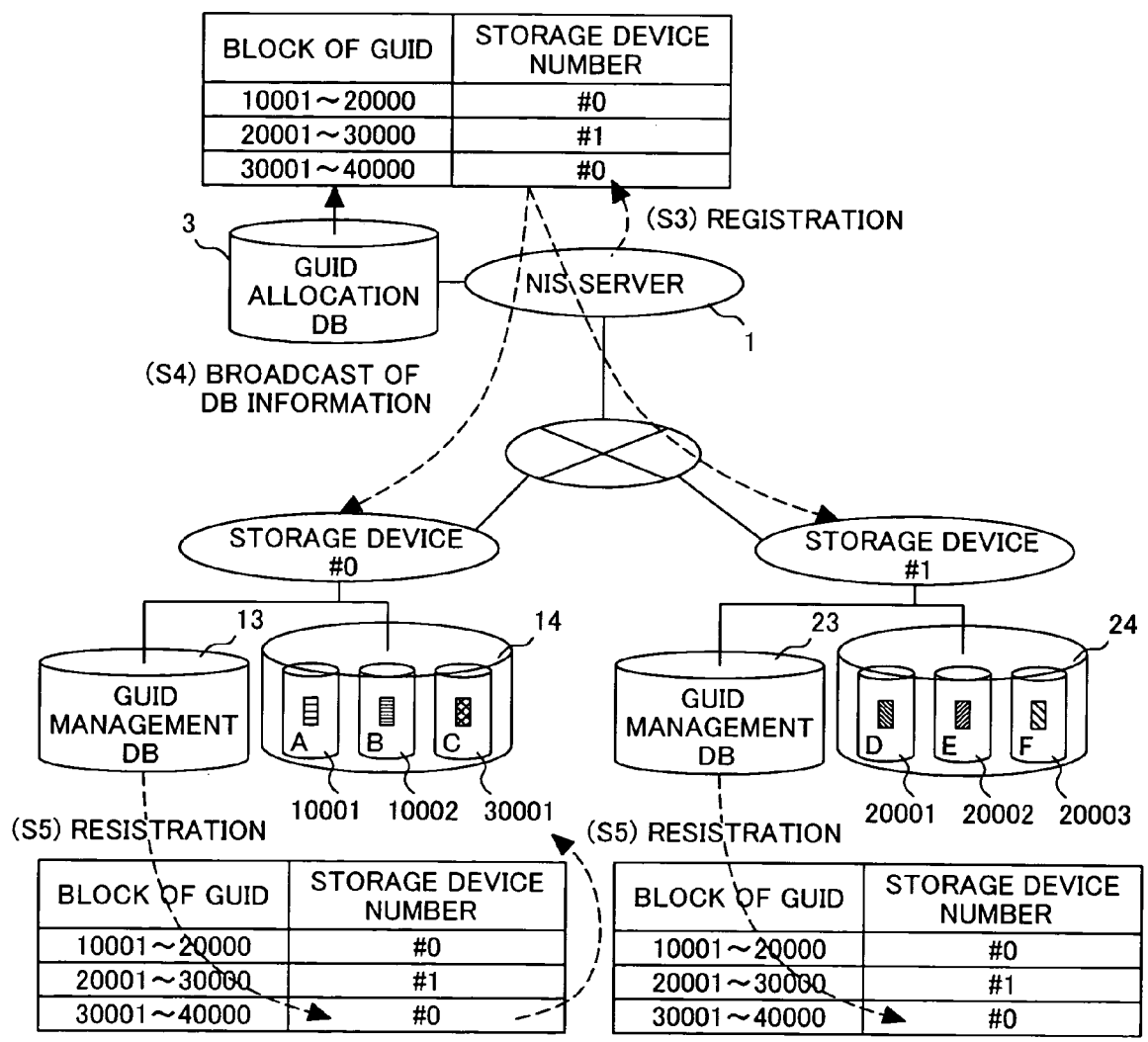
FIG. 3 is an explanatory diagram showing a situation of broadcasting update of a GUID.

Next, the NIS server 1 registers #0 as a storage device number that corresponds to the newly allocated GUID block of 30001–40000 in the GUID allocation DB 3, as shown in FIG. 3 (shown by S3 in the figure).

Next, the NIS server 1 broadcasts information of the GUID allocation DB 3 updated (a set of the GUID block being allocated and a storage device number of the storage device having made the request) to all the storage devices (here, #0 and #1) belonging to the distributed storage system (shown by S4 in the figure).

The storage devices #0, #1 that received updated information of the GUID allocation DB from the NIS server 1 update respective local GUID management DBs 13, 23, and register a fact that the GUID block of 30001 to 40000 has been allocated to the storage device #0 (shown by S5 in the figure).

Figure 4:
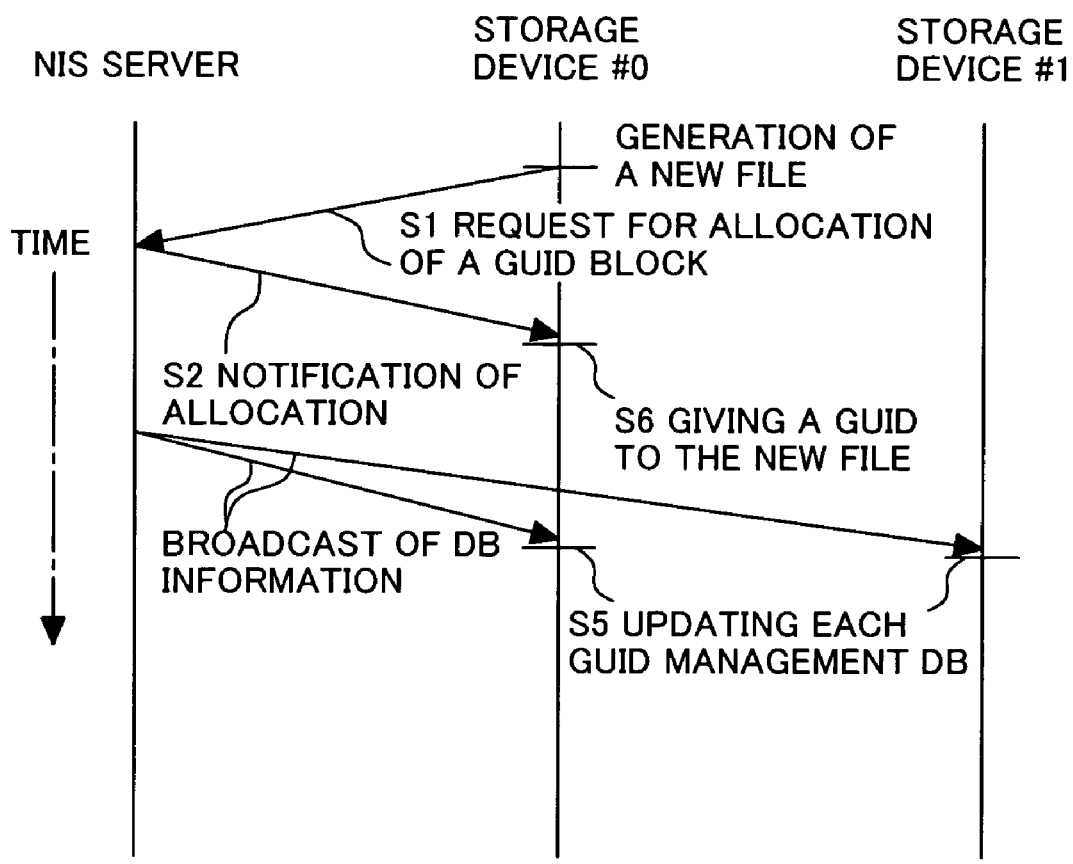
FIG. 4 is a timing chart showing a situation of GUID allocation and its updating in the case of FIG. 3.

This process of allocating the GUID block viewed in chronological order is as shown in FIG. 4; when the storage device #0 makes a request for a GUID block, the NIS server 1 executes notification in step S2, and consequently the storage device #0 can give a GUID to the new file C in step S6 in the figure.

Since after that the NIS server 1 broadcasts the updated information to all the storage devices, the GUID management DBs 13, 23 of all the storage devices will have the same contents in step S5 and thereafter in the figure. Because of this, when the client machine #10 or #11 makes an access request to the storage device, any access request to an arbitrary storage device leads to transfer of the same contents of the storage device; therefore, the consistency of data can be ensured.

As mentioned above, by virtue of the GUID management DBs 13, 23 and both the GUID blocks and the storage device numbers (device IDs) in the GUID allocation DB 3, any file in the storage devices #0, #1 can specify uniquely a storage device number storing its original file by means of its GUID, and it becomes possible for any storage device to inquire a location of the file quickly.

Further, a GUID given to a file at the time of creating the file is broadcast to the storage devices #0, #1 from the management server 1, and recorded in the GUID management DBs 13, 23 of the storage devices; consequently, only one original file exists in the distributed storage system, and each of the GUID management DBs 13, 23 is a database for indicating the device ID of the storage device containing the original file based on the GUID.

Incidentally, to the storage device that requested for a GUID block, information of the same contents is notified twice (S2, S4) by a notification of allocation (S2) and by the broadcast (S4), but updating of the GUID management DB may be performed based on either of the two notifications.

Moreover, described was the example where the NIS server 1, the GUID allocation DB 3 of the storage devices #0, #1, and the GUID management DBs 13, 23 are managed by correlating the storage device number and the GUID block. However, as shown in FIG. 5, the storage device number and the storage identifier for indicating location information, such as a network address, may be used together, or the GUID block and the storage identifier may be used to conduct the management.

Next, the replication of the distributed storage system will be described referring to FIG. 6.

Figure 6:
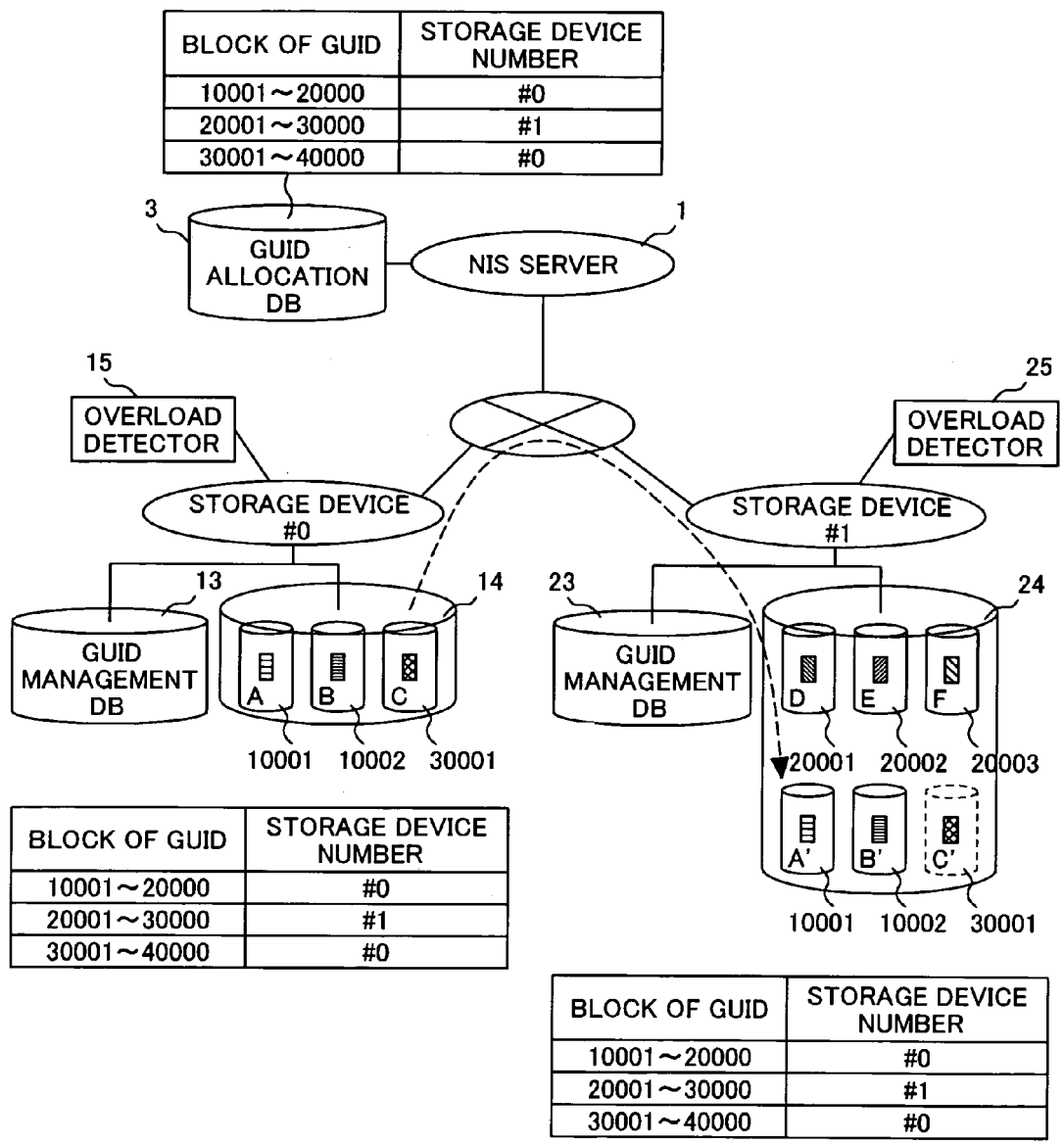
FIG. 6 is an explanatory diagram showing a situation of the replication.

FIG. 6 shows one example where replicas of original files A, B, and C in the storage device #0 are created in the storage device #1.

When the storage device #0 is at light load such that a load detected by the overload sensing device 15 is not more than a previously set value (a state of a few accesses, for example, in the middle of the night), the storage device #0 executes the replication of creating replicas in other storage device #1 for the original files A to C among the files in the disk 14, improving trouble resistance. Note that, for execution of the replication, it is desirable that both a reference storage device containing an original-file and the storage device #1 that will store its replica are at light load. Incidentally, regarding a load that the load sensing device 15 detects, it has to just detect one parameter, for example, a usage rate of the CPU of the controller 12, operation quantity of the disk 14 (Read/Write byte counts per unit time), etc.

Here, the reference storage device means a storage device that is storing the original file. A set of the GUID block in the GUID management DB 13 (23) or the GUID allocation DB 3 and a storage device number specifies the reference storage device. For example, for a file whose GUID is in the range of 10001 to 20000, the storage device #0 is the reference storage device; for a file whose GUID is in the range of 20001 to 30000, the storage device #1 is the reference storage device.

The replication is done by referring the GUID management DB 13 and replicating a file, the file being such that a number of a storage device storing it agrees with the reference storage device number determined by its GUID, in other storage device.

Therefore, the replication of the storage device #0 is done by replicating the files A, B whose GUIDs are in a GUID block of GUID 10001 to 20000 and the file C whose GUID is in a GUID block of GUID 30001 to 40000 in the storage device #1.

Replicas A' to C' of the files A to C are created in the disk 24 of the storage device #1. The files A' to C' replicated in the storage device #1 are accompanied with "'" only for explanation, and are actually the same as the files A to C, having also the same GUIDs as those of the files A to C in the storage device #0.

Figure 7:
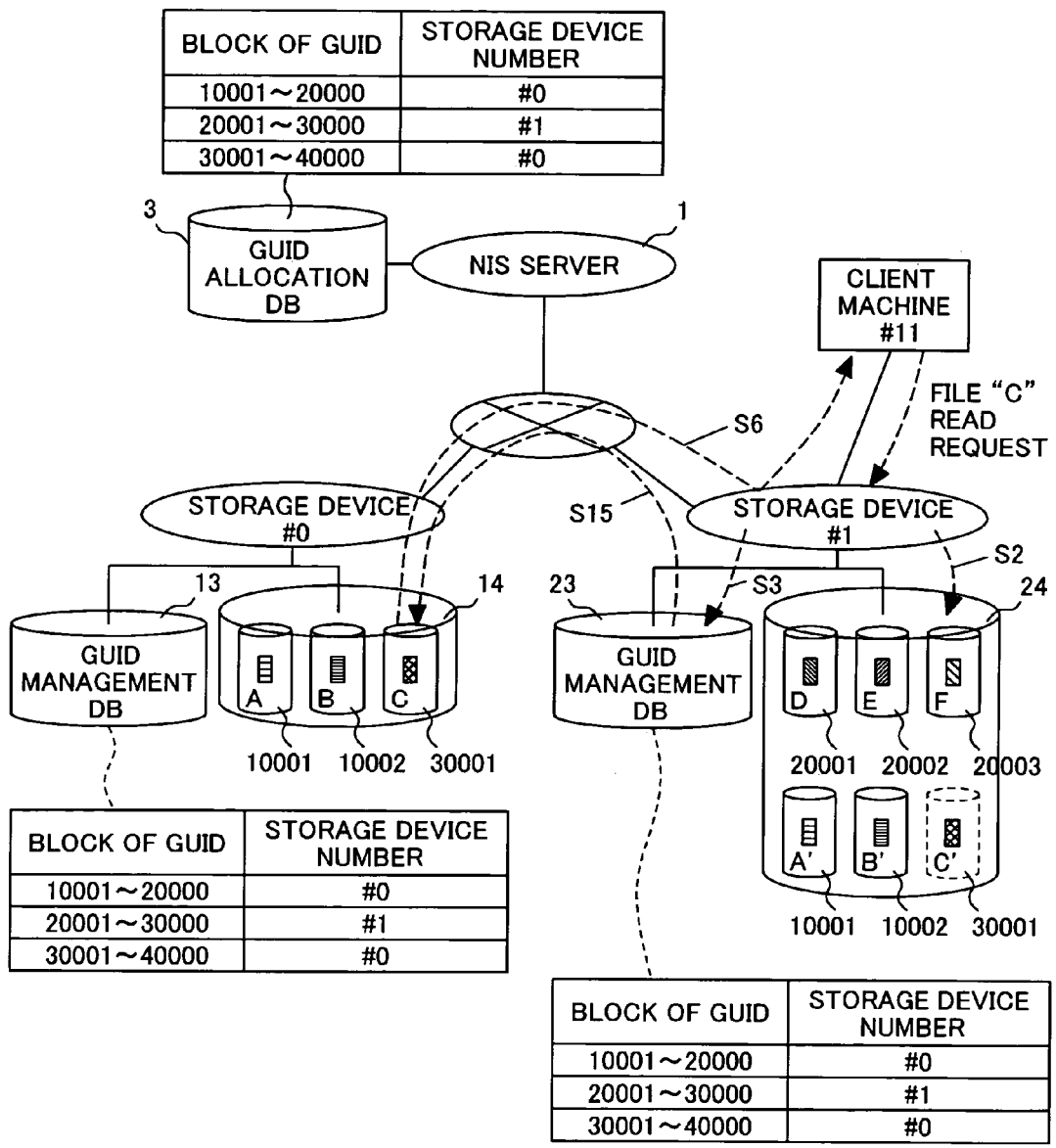
FIG. 7 is an explanatory diagram showing a data flow when a READ request was made by a client machine during the replication.

Next, since it takes a time to execute the replication, from the start to the completion, there might be a case where, during a period in which the replication is being done from the storage device #0 to the storage device #1, as shown in FIG. 7, i.e., a replica of the file C shown by the broken line in the figure has not yet been completed, the client machine #11 makes a READ request to its local storage device #1 for the file C with a GUID=30001;

In this case, the storage device #1 conducts the following control.

In FIG. 7, when accepting the access request for the file C by the client machine #11, the storage device #1 finds out that the replica of the file C (shown by the broken line in the figure) has not yet been created in the local disk 24. The storage device #1 searches the GUID management DB 23 to find the reference storage device of the file C with a GUID=30001, and judges that it is the storage device #0.

The storage device #1 makes a request to the storage device #0 that is the reference storage device for reading of the file C with a GUID=30001. The storage device #1 transfers an original file C from the storage device #0 to effect its transmission to the client machine #11.

In this way, in the replication in the distributed storage system, when creating a replica in a storage device located in a different location through the network 10 etc., there occurs a delay until all replicas have been completed. If there is an access request for a file whose replica has not yet been created, the access request is transferred to the reference storage device storing its original file, and the file is read from the reference storage device, whereby the object file will be read on the distributed storage system surely irrespective of completion or incompletion of its replica, hence ensuring the consistency of data. Particularly, even in the case where the replication is done frequently, when an access request was made by the client machine #10 or the client machine #11, if a replica of the demanded file has not been created, the access is made to the reference storage device that is determined uniquely by its GUID; therefore, the reading of the file can be ensured without being affected by a delay resulting from the replication.

Figure 8:
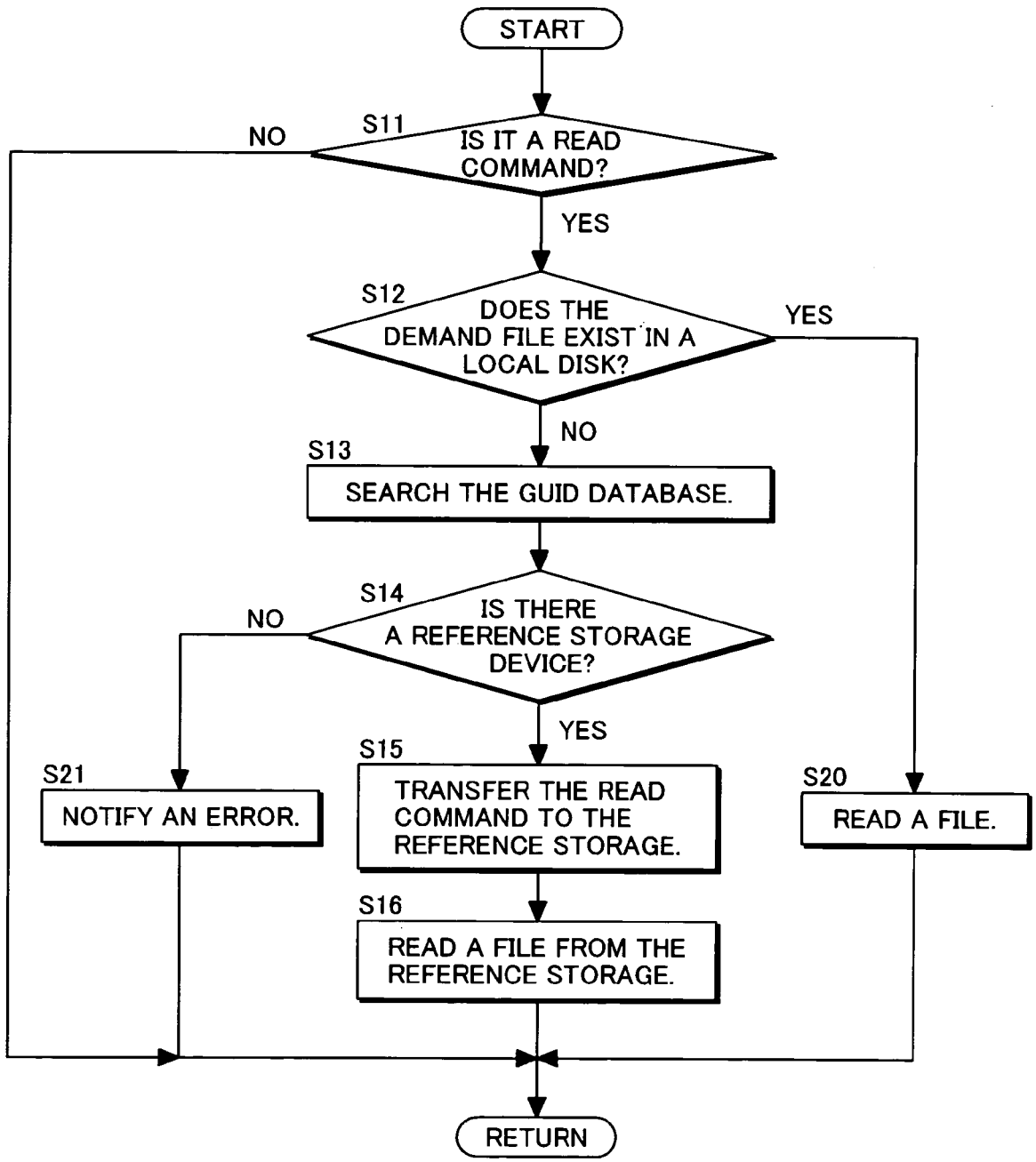
FIG. 8 is a flowchart showing an example of a reading operation performed by the storage device in the case of FIG. 7.

FIG. 8 shows one example of control of the storage device #1 in response to the READ request shown in the above-mentioned FIG. 7. This FIG. 8 shows the flowchart that the controller 22 of the storage device #1 executes when the storage device #1 accepted a command from the client machine #10 or #11.

First, in step S11, the storage device #1 judges whether or not the demand command is a READ request command, and if it is the READ request command, the flow proceeds to step S12, in which the storage device #1 judges whether or not the disk 24 has the file demanded by the READ command.

If the demanded file is in the disk 24, the flow proceeds to step S20, in which the storage device #1 transmits the file in the disk 24 to the client machine that is a request source. In the example in FIG. 7, in the case of a READ request for a file other than the file C, the files A', B', and D to F are read.

On the other hand, if, on the judgment in the step S12, the disk 24 does not have the demanded file, the flow proceeds to step S13, in which the storage device #1 searches the GUID management DB 23 based on the GUID of the demanded file and reads the reference storage device.

In step S14, the storage device #1 judges the presence/absence of the reference storage device of the demanded file. If the reference storage device was not found, the flow proceeds to step S21, in which the storage device #1 notifies the request-source client machine of an error. On the other hand, if the reference storage device was found, the flow proceeds to step S15, in which the storage device #1 transfers the READ command for the file C to the reference storage device from the client machine (in the example in FIG. 7, the storage device #0).

In step S16, the storage device #1 reads the file C demanded by the storage device #0 that is the reference storage device by remote access, and transmits it to the request-source client machine (client machine #11).

By the above reading control, when a READ request for a file was made by the client machine, if the local disk 24 has the file, the storage device #1 transmits the file in this disk 24 to the client machine. If the disk 24 does not have the file or the file is being created therein, the storage device #1 searches the reference storage device of the file from the GUID of the demanded file, sends the READ request to the reference storage device, reads the demanded file by remote access, and transmits it to the client machine.

Thereby, the client machine becomes insensitive to a delay during the replication, can read the file quickly, so that access to data in the distributed storage system that does the replication can be ensured, hence improving system reliability.

Further, the client machine #10, #11 only make READ requests to the storage device #0, #1, and do not need to recognize where its original file is stored. They can acquire the data on the distributed storage system only by always accessing an arbitrary storage device, and can improve the accessibility from the client machine.

Note that, in the foregoing, explained was the case where the client machine #11 made the READ request to the storage device #1. A case where the client machine #10 or #11 makes a READ request to the storage device #0 is the same as the above-mentioned case.

In the foregoing, described was the example where the storage device #1 transferred the READ request from the client machine #11 to the storage device #0 containing the original file, the storage device #1 read this and transmitted it to the client machine #11. A variant in which the storage device #1 acquaints the client machine #11 with a location of the reference storage device, and the client machine #11 accesses the reference storage device may be adopted.

Figure 9:
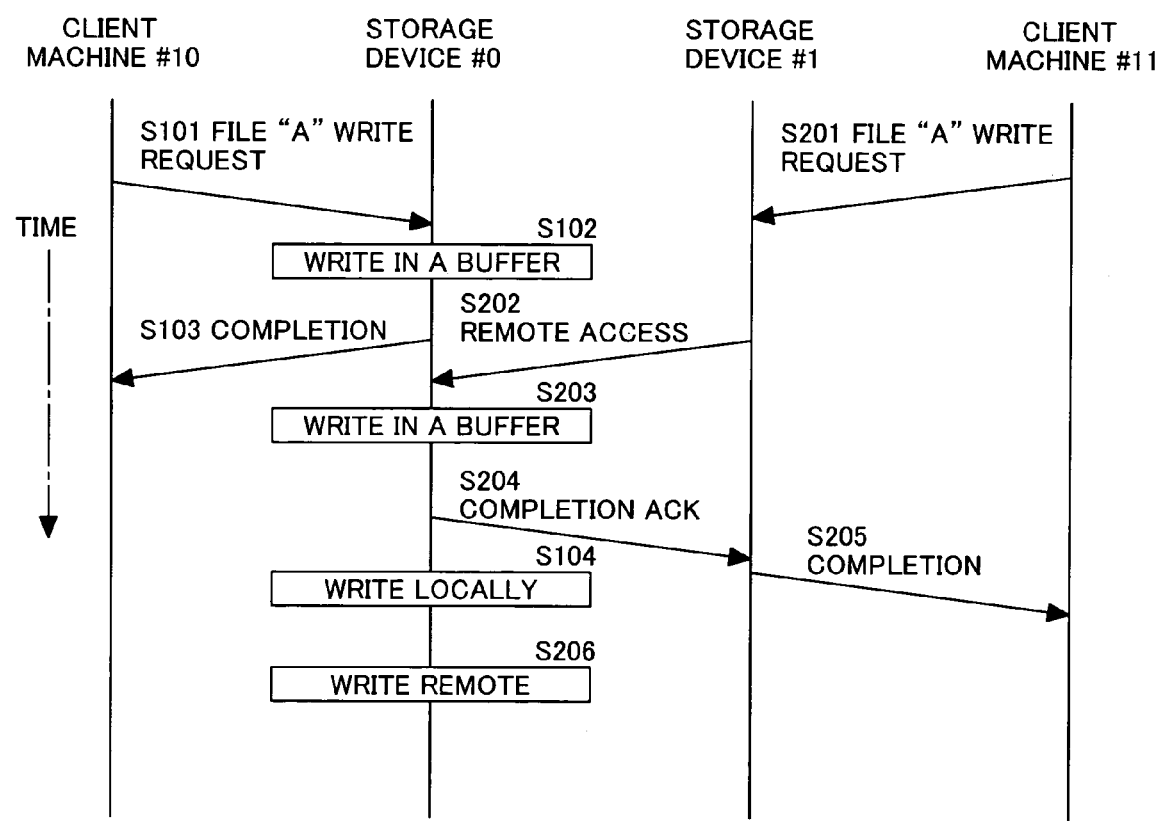
FIG. 9 is a timing diagram showing a data flow when there are WRITE requests from a plurality of client machines simultaneously.
Figure 10:
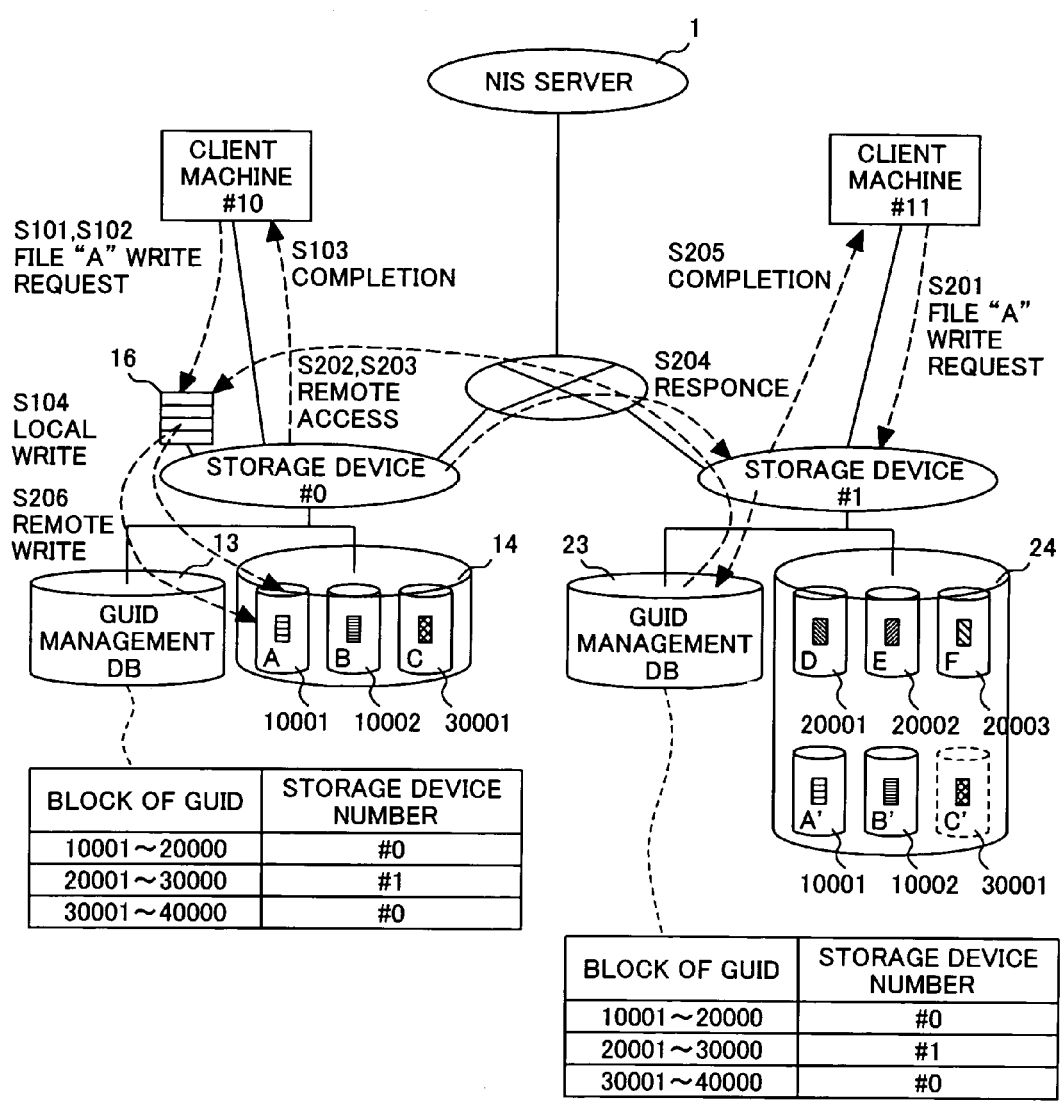
FIG. 10 is an explanatory diagram showing a data flow when a plurality of client machines make WRITE requests simultaneously in the case of FIG. 9.

Next, a case where the client machines #10, #11 made WRITE requests for the same file simultaneously will be described referring to FIG. 9 and FIG. 10.

The client machine #10 and the client machine #11 make WRITE requests for the file A simultaneously; the client machine #10 makes a request to the local the storage device #0 and the client machine #11 makes a request to the local the storage device #1, respectively.

The storage device #0 searches the reference storage device of the file A from the GUID management DB 13 based on its GUID in response to the WRITE request (S101) from the client machine #10. Since the reference storage device of the file A is the storage device #0, the storage device #0 accepts the request from the client machine #10, and writes the contents of the new file A sent by the client machine #10 in the buffer 16 of the controller 12 (S102). When the writing in the buffer 16 is ended, the storage device #0 transmits a notification of writing completion to the client machine #10 (S103).

On the other hand, writing of the file A for which the client machine #11 made a request to the storage device #1 is transferred to the storage device #0. Since the storage device #1 stores only the replica A' of the file A, the writing into the replica is inhibited. Because of this, the storage device #1 searches the reference storage device containing the original of the file A from the GUID management DB 23 based on the GUID of the demanded file A. If the search result indicates that the reference storage device is the storage device #0, the storage device #1 makes a request to the storage device #0 for writing of the file A by remote access (S202).

When the writing in the buffer 16 from the client machine #10 is ended, the storage device #0 accepts the WRITE request from the storage device #1 and allows the storage device #1 to write the contents of the file A for which the client machine #11 made a request in the buffer 16 of the storage device #0 (S203).

When the writing from the client machine #11 by remote access is ended, the storage device #0 transmits a reply of writing completion to the storage device #1 (S204). When the storage device #1 receives this reply, the storage device #1 transmits a notification of writing completion to the client machine #11 (S205). That is, to the client machine, the notification of completion is transmitted at the time when the writing in the buffer 16 has been completed.

Next, the storage device #0 writes the contents of the file A, as written in the buffer 16, in the disk 14 serially. That is, the storage device #0 updates the disk 14 by writing the contents of the client machine #10—whose WRITE request was accepted first—in the file A (S104), and then updates the disk 14 by writing the contents of the client machine #11 whose request was accepted next (S206).

Whenever there is a WRITE request, the original file is always subjected to updating in this way, whereby replicas stored in a distributed manner are inhibited from losing their consistency, and the consistency of files can be ensured.

Moreover, regarding the processing of WRITE requests, the system is configured so that the contents of the file A to be written are accumulated in the buffer 1.6 in the order of reception of the requests and subsequently the contents of the buffer 16 are written in the disk 14 serially; therefore, consistency of an order of writing can be ensured. Particularly in the case of the network 10 being constructed with the Internet, there may be a case where the order of arrival of data (packets) does not agree with the order of requests. Because of this, the contents to be written are stored in order in which the requests are accepted in the buffer 16 installed in the controller 12 of the storage device #0, and the writing in the disk 14 is performed serially after the completion of writing in the buffer 16; thereby, the consistency of an order of file writing can be ensured.

It is desirable that the client machine #11 performing the writing by remote access is inhibited from transmitting a next WRITE request until it receives a notification of writing completion. That is, as mentioned above, in the case of the network 10 being constructed with the Internet, there may be a case where a packet pertaining to a later request arrives at the storage device #0 earlier than a packet pertaining to an early request, the client machine #11 waits the writing completion and then transmits a next write request, whereby inconsistency of an order of writing can be prevented.

Figure 11:
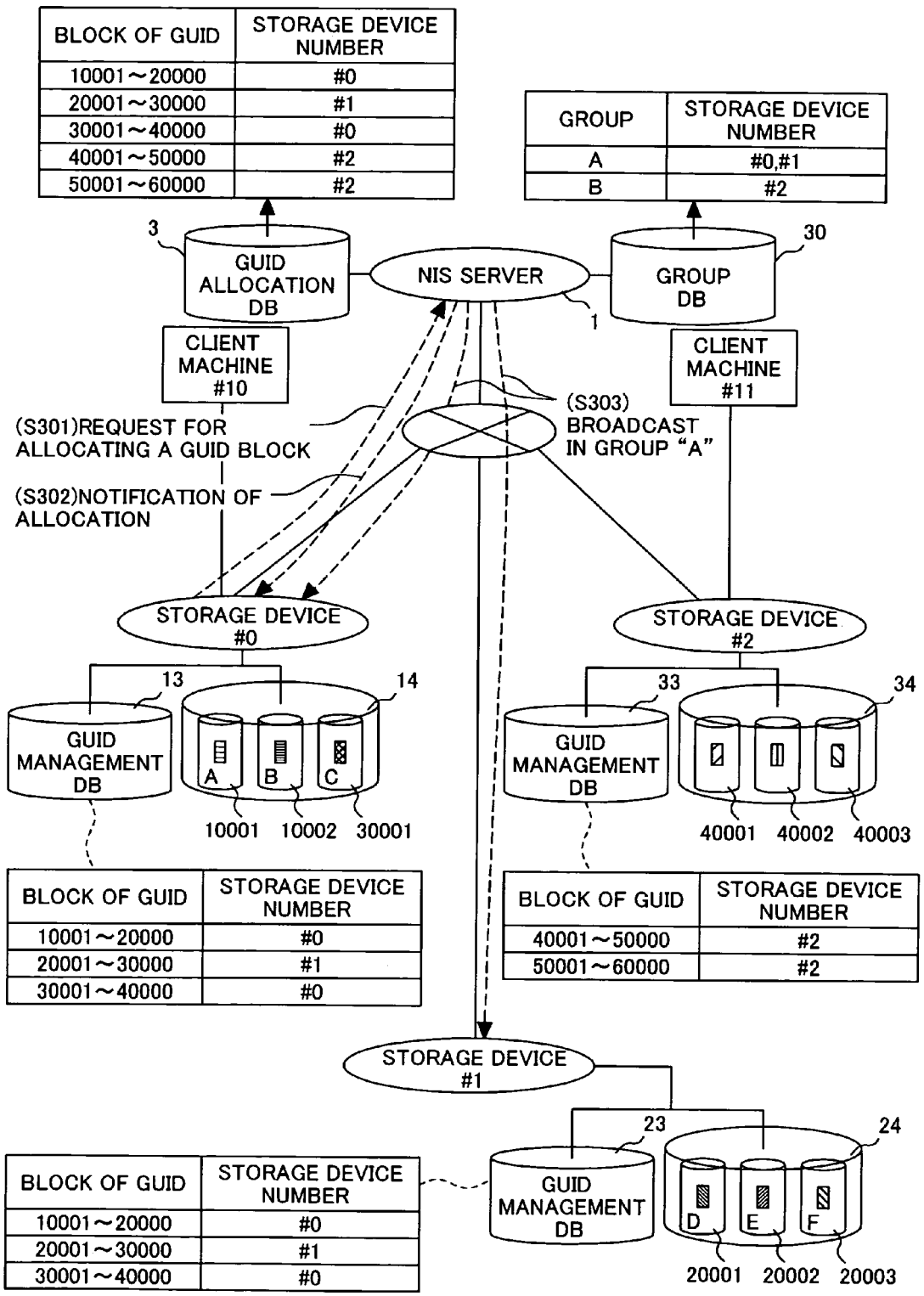
FIG. 11 is an explanatory diagram showing a second embodiment, and illustrating a situation in which GUID allocation and its updating on a group basis is broadcast.

FIG. 11 shows the second embodiment. In this second embodiment, two or more groups are provided in a single distributed storage system, and access and the replication are allowed to be done within each group, in contrast to the first embodiment where the storage devices constitute one group in the single distributed storage system.

The second embodiment in FIG. 11 is the modification of the first embodiment in FIG. 2 by addition of: a storage device #2 comprising a disk 34 and a GUID management DB 33; and a group management database (hereinafter referred to as the group management DB) 30 besides the GUID allocation DB 3 for the NIS server 1; wherein other constituents are the same as those of the first embodiment.

In this distributed storage system, the NIS server 1 divides the storage devices under its management into two groups, Group A and Group B, and allows the storage devices to access other storage devices only within its group, inhibiting one group from accessing other groups.

For this scheme, the NIS server 1 is equipped with the group management DB 30 for managing the storage devices belonging to either the Group A or the Group B. In the group management DB 30, storage device numbers (or storage identifiers) that belong to each group has been set in advance by a system administrator or the like; for example, it is set that the storage devices #0, #1 belong to the Group A and the storage devices #2 belongs to the Group B.

On the other hand, regarding the GUIDs that the GUID allocation DB 3 allocates to the storage devices, the GUID blocks are allocated to the storage devices on a storage basis, irrespective of its group, so that the GUIDs acts as unique identifiers in the whole distributed storage system. Specifically, the GUID blocks of 10001–40000 are allocated to the storage device #0 and the storage device #1 as with the first one embodiment; GUID blocks of 40001–60000 are allocated to the storage device #2. A scheme of setting the GUIDs as unique identifiers in the whole system, irrespective of the groups, can prevent that the GUIDs from overlapping when the group of storage devices is changed.

Now, when the storage device #0 makes a request to the NIS server 1 for allocation of a GUID block (S301), the NIS server 1 allocates an unused GUID block to the storage device #0 as with the first embodiment.

After that, the NIS server 1 registers the storage device number corresponding to the new GUID block in the GUID allocation DB 3 to effect updating, and broadcasts the contents of this updating to only the Group A to which the storage device #0 belongs (S303).

That is, the NIS server 1 refers to the group management DB 30, and notifies the contents of updating only to the storage devices #0, #1 in the Group A to which the storage device #0 belongs; the storage devices #0, #1 in the Group A register the contents of updating that were broadcast in their GUID management DBs 13, 23, respectively.

The reason for this is that it is not necessary for storage devices in the Group B to know the GUIDs indicating the reference storage device in the Group A because access between storage devices belonging to different groups is not made.

Next, access control will be described, referring to FIG. 12.

As a first case, when the client machine #10 reads the file F of the storage device #1, first the client machine #10 transmits a READ request for the file F to the storage device #0 connected locally. Since the storage device #0 does not have the file F in its disk 14, it searches the GUID management DB 13 from a GUID of the file F included in the READ request, and finds the storage device #1 that is the reference storage device of the file F.

Next, the storage device #0 transfers the READ request for the file F to the storage device #1 (S312). The storage device #1 reads the file F and transfers its data to the storage device #0 (S313). Finally, the storage device #0 transmits the data of the file F received from the storage device #1 to the client machine #10, and ends the processing.

In this way, within the same group, if the storage device does not have the data in its local disk, the storage device #0 inquires of the reference storage device that was searched based on the GUID, and reads the object file, similarly with the first embodiment.

On the other hand, the access control between the storage devices belonging to different groups becomes as follows.

Figure 12:
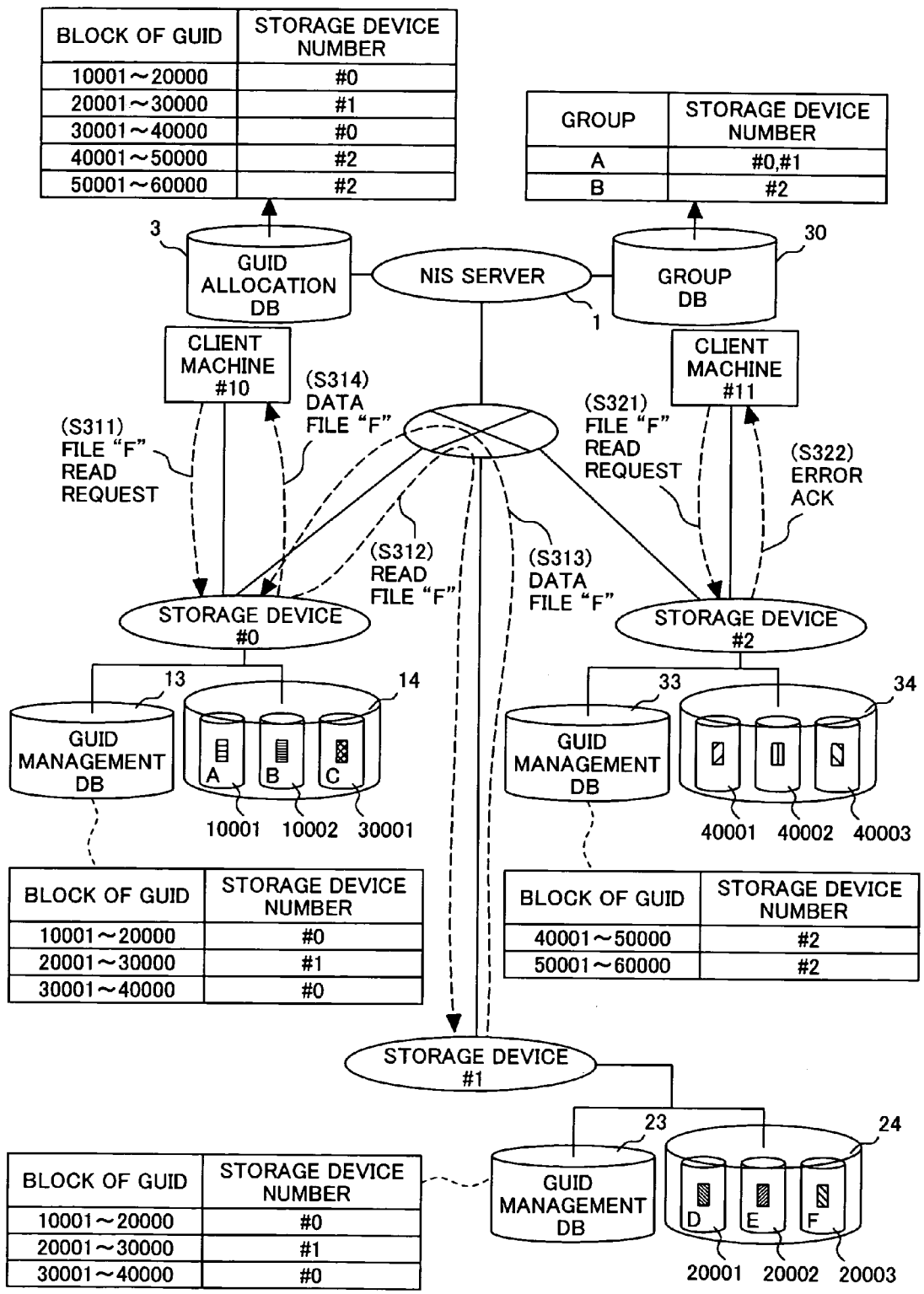
FIG. 12 is an explanatory diagram showing a data flow at the time of performing a reading operation on a group basis.

In FIG. 12, if the client machine #11 makes a READ request for the file F (GUID=20003) of the Group A to the local storage device #2 (S321), because the storage device #2 does not have the file F in its local disk 34, the storage device #2 searches the GUID management DB 33 based on the GUID of the file F.

However, since the GUID management DB 33 does not have information about the Group A, the reference storage device cannot be found. As a result, the storage device #2 notifies the client machine #11 of occurrence of an error (S322).

In this way, regarding an access between different groups, since information is not registered in the GUID management DB of the storage devices, the storage device cannot determine which storage device should be accessed, and then mutual accessing is inhibited.

Thereby, it becomes possible to increase trouble resistance by the replication while ensuring security among groups by providing two or more groups in the same distributed storage system.

In addition, although described was the example in which the group management DB 30 of the NIS server 1 managed the groups by correlating the group name (group identifier) and the storage device numbers, the NIS server 1 may manage them by the group name and a storage ID for indicating location information, such as a network address of the storage device, as shown in FIG. 13. Alternatively, a single storage device may be registered in two groups; it is possible for two groups to share one storage device #1 by, for example, registering the storage device #1 both in the Group A and in the Group B.

Figure 14:
FIG. 14 is an explanatory diagram showing a situation of registration in the case where a storage device is shared by two or more groups.
Figure 14:

For example, when the storage device is registered in two or more groups on the console of the NIS server 1, expressing an identifier of the storage device by its IP address, as shown in FIG. 14, the IP address of the storage device is inputted on screen S401 in the figure, subsequently "A" is inputted as a group name (group identifier) to be registered on screen S402, and "B" is inputted as a group name to be registered next on screen S403. As a result, this storage device can be added to both the Group A and the Group B in the group management DB 30 of the NIS server 1, which enables the two groups to share this storage device.

Preferably, the replication, which is executed internally in each group, may be done when the load is light as with the first embodiment. In the Group A, each original file is copied between the storage device #0 and the storage device #1, from one device to the other device, when the load is light as with the first embodiment. In FIG. 11 and FIG. 12, to simplify the explanation, the Group B is assumed to consist of only the storage device #2. However, the Group B may be provided with a plurality of storage devices. In such a case, all that is required is to copy original files among the storage devices.

Moreover, in the above-mentioned embodiments, described was the example where the Group A consisted of the storage devices #0, #1, but each storage device may be replaced with a storage node or site that is composed of a plurality of storage devices.

Since in the distributed storage system according to this invention, as mentioned above, even when the replication in the local storage device is not completed, the local storage device can transfer an original file from a storage device containing that file and enables the client machine to read the file, application of this invention can increase availability of a site while assuring the consistency of files between the storage devices.

What is claimed is:

1. A file management method of a distributed storage system, which includes a plurality of distributed storage devices, and a management server for managing identifiers of files stored in these storage devices and the storage devices,
wherein said management server performs at least the steps of:
allocating Globally Unique Identifiers (GUIDs) as unique identifiers to a storage device based on a request from the storage device, and
storing a state of allocation of the GUIDs in a GUID allocation database of the management server,
wherein the storage device performs at least a step of giving GUIDs that were allocated by the management server to files,
wherein the storage device performs at least steps of:
giving a GUID to a new file every time the storage device creates the new file,
making a request to the management server for GUIDs when allocated GUIDs run short,
wherein the management server performs at least a step of:
allocating unused GUIDs to the storage device in increments of a block in response to the request from the storage device.

2. The file management method of a distributed storage system according to claim 1, wherein the management server performs at least a step of:
transmitting the unused GUIDs that were allocated and a device ID of the storage device to each storage device, and
wherein each storage device performs at least a step of:
storing the GUIDs and the device ID of the storage device that were transmitted to the GUID management database installed for each storage device.

3. The file management method of a distributed storage system according to claim 1, wherein the management server comprises:
at least one group of storage devices; and
group management databases each for managing correspondence between the storage device belonging to each of the at least one group and the device ID thereof,
wherein when a storage device is additionally provided, the management server performs at least the following steps of:
setting a device ID for the storage device;
correlating the device ID with a group identifier; and
registering correspondence between the device ID and the group identifier in the group management database.

4. The file management method of a distributed storage system according to claim 3, wherein the management server performs at least a step of:
transmitting the unused GUIDs that were allocated and a device ID of the storage device to storage devices in a group to which the allocated storage device belongs, and
wherein the storage device belonging to the group performs at least a step of:
storing a GUID transmitted to local GUID management databases installed in respective storage devices and the device ID of the storage device.

5. The file management method of a distributed storage system according to claim 3, wherein the storage device refuses an access from a storage device whose group ID is different.

6. The file management method of a distributed storage system according to claim 1, wherein the distributed storage system comprises:
a client machine that accesses the storage device,
wherein when the client machine makes a request to the storage device for reading of a file, if this storage device does not have the requested file, the storage device performs at least the following steps of:
selecting a storage device containing an original file from the GUID management database of the storage device based on a GUID corresponding to the file;
transferring the request to the selected storage device and reading the requested file; and
transferring the read file to the client machine.

* * * * *